(12) United States Patent
Chang et al.

(10) Patent No.: US 8,643,601 B2
(45) Date of Patent: Feb. 4, 2014

(54) RETRACTABLE CABLE MOUSE

(75) Inventors: A-Ming Chang, Taipei (TW); Ying-Che Tseng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 124 days.

(21) Appl. No.: 13/437,655

(22) Filed: Apr. 2, 2012

(65) Prior Publication Data

US 2013/0257730 A1     Oct. 3, 2013

(51) Int. Cl.
*G06F 3/033* (2013.01)
*G09G 5/00* (2006.01)

(52) U.S. Cl.
USPC ........................................ 345/163; 361/679.4

(58) Field of Classification Search
USPC ................ 345/156–184; 361/679.01–679.61; D14/402–410
See application file for complete search history.

(56) References Cited

U.S. PATENT DOCUMENTS

| | | | | |
|---|---|---|---|---|
| 6,088,021 | A * | 7/2000 | Yong .............................. | 345/163 |
| 6,392,635 | B1 * | 5/2002 | Snyder .......................... | 345/163 |
| 6,434,249 | B1 * | 8/2002 | Wei ............................... | 381/370 |
| 6,452,586 | B1 * | 9/2002 | Holmdahl et al. ............ | 345/163 |
| 6,803,525 | B1 * | 10/2004 | Liao .............................. | 174/135 |
| 6,871,812 | B1 * | 3/2005 | Chang ....................... | 242/378.1 |
| 7,050,041 | B1 * | 5/2006 | Smith et al. ................... | 345/156 |
| 7,159,700 | B2 * | 1/2007 | Liao .............................. | 191/12.4 |
| 7,317,446 | B1 * | 1/2008 | Murphy ........................ | 345/163 |
| 2001/0043192 | A1 * | 11/2001 | Murphy ........................ | 345/163 |
| 2002/0023814 | A1 * | 2/2002 | Poutiatine ................ | 191/12.2 R |
| 2002/0053622 | A1 * | 5/2002 | Kagel ........................... | 242/379 |
| 2003/0128189 | A1 * | 7/2003 | Chung .......................... | 345/163 |
| 2003/0184521 | A1 * | 10/2003 | Sugita ........................... | 345/163 |
| 2004/0169106 | A1 * | 9/2004 | Huang ....................... | 242/385.3 |
| 2004/0178991 | A1 * | 9/2004 | Wei ............................... | 345/163 |
| 2004/0201574 | A1 * | 10/2004 | Wei ............................... | 345/163 |
| 2005/0046385 | A1 * | 3/2005 | Chung .......................... | 320/114 |
| 2006/0194468 | A1 * | 8/2006 | Griffin ......................... | 439/352 |
| 2006/0232555 | A1 * | 10/2006 | Wu ............................... | 345/163 |
| 2006/0261203 | A1 * | 11/2006 | Yang ......................... | 242/378.4 |
| 2008/0030471 | A1 * | 2/2008 | Wu ............................... | 345/163 |
| 2008/0064262 | A1 * | 3/2008 | Wu ............................... | 439/610 |
| 2008/0084394 | A1 * | 4/2008 | Kang ............................ | 345/166 |
| 2008/0204414 | A1 * | 8/2008 | Pi ................................. | 345/166 |
| 2010/0035463 | A1 * | 2/2010 | Wang et al. ................... | 439/501 |
| 2010/0085305 | A1 * | 4/2010 | Yang ............................ | 345/163 |
| 2010/0231397 | A1 * | 9/2010 | Ke ................................ | 340/654 |
| 2011/0084906 | A1 * | 4/2011 | Wu ............................... | 345/163 |
| 2011/0139918 | A1 * | 6/2011 | Chen ............................ | 242/371 |
| 2011/0254766 | A1 * | 10/2011 | Chang .......................... | 345/163 |
| 2011/0298712 | A1 * | 12/2011 | Ma et al. ....................... | 345/163 |
| 2012/0229386 | A1 * | 9/2012 | Chang et al. .................. | 345/163 |

* cited by examiner

*Primary Examiner* — Gene W Lee
(74) *Attorney, Agent, or Firm* — Evan R. Witt; Kirton McConkie

(57) ABSTRACT

A retractable cable mouse includes a casing, a cable reel member, a connector, a sliding member, and an elastic element. The connector is coupled with the cable reel member and contacted with the sliding member. The elastic element is contacted with the sliding member and coupled with the casing. When the sliding member is moved to a first position, the connector is stored within the casing, and the sliding member is sustained against elastic element, so that the elastic element is compressed. When the sliding member is pulled out of the casing, the compressed elastic element provides an elastic force. In response to the elastic force, the sliding member is moved to a second position. Meanwhile, a perforation of the casing is blocked by sliding member, so that the external dust or foreign material fails to be introduced into the internal portion of the casing.

10 Claims, 6 Drawing Sheets

RETRACTABLE CABLE MOUSE

FIELD OF THE INVENTION

The present invention relates to a mouse, and more particularly to a retractable cable mouse.

BACKGROUND OF THE INVENTION

Hereinafter, the configurations and the function of a conventional wheel mouse will be illustrated with reference to FIG. 1. FIG. 1 schematically illustrates the connection between a conventional mouse and a computer system. As shown in FIG. 1, the computer system 2 comprises a computer host 21 and a computer monitor 22. The computer host 21 is in communication with a wheel mouse 1 and the computer monitor 22. In addition, the computer host 21 has a connecting port 211. A graphic-based window 221 and a cursor 222 are shown on the computer monitor 22. The wheel mouse 1 is used for controlling the cursor 222 to have the computer host 21 execute a corresponding command. The wheel mouse 1 comprises a casing 10, a left button 11, a right button 12, a scroll wheel 13, a connecting cable 14, and a connector 15. The casing 10 is used for supporting a user's palm. When the casing 10 is moved by the user to generate a displacement amount, the cursor 222 shown on the computer monitor 22 is correspondingly moved by the computer host 21 according to the displacement amount. By clicking the left button 11 or the right button 12, a control signal is issued to the computer host 21. In response to the control signal, the computer host 21 executes a corresponding command. The scroll wheel 13 is arranged between the left button 11 and the right button 12. By rotating the scroll wheel 13, a scrolling signal is generated. In response to the scrolling signal, the computer host 21 executes a function of scrolling the graphic-based window 221. An end of the connecting cable 14 is coupled with the connector 15. Through the connecting cable 14, these signals may be transmitted to the computer host 21. After the connector 15 is plugged into the connecting port 211 of the computer host 21, the communication between the wheel mouse 1 and the computer host 21 will be established. The basic functions of the wheel mouse 1 have been mentioned above.

Generally, the conventional wheel mouse 1 has no mechanism for storing the connecting cable 14. Since the connecting cable 14 fails to be stored within the casing 10, if the user wants to carry the conventional wheel mouse 1, two approaches are employed to fix the connecting cable 14. In accordance with a first approach, the connecting cable 14 is bent for several turns to shorten the length thereof, and then the connecting cable 14 is bound together. In accordance with a second approach, the connecting cable 14 is wound around the casing 10. The connecting cable 14 fixed by these two approaches is neither convenient nor aesthetically pleasing. For solving the above drawbacks, a retractable cable mouse for concealing and storing the connecting cable has been introduced into the market.

Hereinafter, the configurations of a conventional retractable cable mouse will be illustrated with reference to FIG. 2. FIG. 2 is a schematic perspective view illustrating a conventional retractable cable mouse. As shown in FIG. 2, the retractable cable mouse 3 comprises a casing 30, an upper cover 31, a left button 32, a right button 33, a scroll wheel 34, a cable reel member 35, and a connector 36. The casing 30 has a perforation 301. The perforation 301 is formed at a front side of the casing 30. The casing 30 is sheltered by the upper cover 31. The upper cover 31 has an upper cover opening 311. The left button 32 and the right button 33 are disposed on the upper cover 31. The left button 32 is located at a first side of the upper cover opening 311. The right button 33 is located at a second side of the upper cover opening 311. The scroll wheel 34 is disposed within the casing 30. Moreover, the scroll wheel 34 is partially penetrated through the upper cover opening 311 and exposed outside the upper cover 31 to be manipulated by the user.

The cable reel member 35 comprises a connecting cable 351 and a reel main body 352. A first end of the connecting cable 351 is coupled with the connector 36. A second end of the connecting cable 351 is coupled with the reel main body 352. The reel main body 352 is used for winding the connecting cable 351 so as to store the connecting cable 351. As shown in FIG. 2, the connecting cable 351 is penetrated through the perforation 301 of the casing 30 and thus protruded outside the casing 30. The connector 36 is coupled with the connecting cable 351 of the cable reel member 35. By connecting the connector 36 with the computer host 21 of the computer system 2 (see FIG. 1), the retractable cable mouse 3 is in communication with the computer host 21. In this embodiment, the connector 36 is a universal series bus (USB) connector.

FIG. 3 schematically illustrates the conventional retractable cable mouse whose connector is stored. In FIG. 3, a bottom surface 302 of the casing 30 of the retractable cable mouse 3 is shown. The bottom surface 302 has a receiving recess 3021. The receiving recess 3021 is located beside the perforation 301. The shape of the receiving recess 3021 is fitted to the shape of the connector 36. In a case that the retractable cable mouse 3 is in a non-usage status, the connecting cable 351 may be stored within the reel main body 352, but the portion of the connecting cable 351 coupled with the connector 36 is still exposed outside the casing 30. After the exposed portion of the connecting cable 351 is bent, the connector 36 coupled with the connecting cable 351 may be stored within the receiving recess 3021 (see FIG. 3).

From the above discussions, it is found that the connector 36 may be plugged into the computer host 21 when the retractable cable mouse 3 is in the usage status. Moreover, when the retractable cable mouse 3 is in the non-usage status, the connecting cable 351 may be shortened and the connector 36 may be stored within the receiving recess 3021 by means of the cable reel member 35. Since the connecting cable 351 can be stored within the casing 30, the retractable cable mouse 3 is easily carried. Moreover, since the connecting cable 351 is not exposed outside the casing 30 in the non-usage status, the retractable cable mouse 3 is aesthetically pleasing. Although the conventional retractable cable mouse 3 has the above advantages, there are still some drawbacks. Since the connector 36 should be stored within the receiving recess 3021, if the retractable cable mouse 3 has been used for a long time, the portion of the connecting cable 351 coupled with the connector 36 is frequently bent and easily damaged. Under this circumstance, the signal fails to be transmitted to the computer host 21 through the connecting cable 351. For protecting the connecting cable 351, the connector 36 may be exposed outside the casing 30 without storing the connector 36 within the receiving recess 3021. However, if the retractable cable mouse 3 has been used for a long time, the connector 36 is also easily damaged.

SUMMARY OF THE INVENTION

The present invention provides a retractable cable mouse having a mechanism for protecting the connector and the connecting cable.

In accordance with an aspect of the present invention, there is provided a retractable cable mouse. The retractable cable mouse includes a casing, a cable reel member, a connector, a sliding member, and an elastic element. The casing has a sliding groove. That sliding groove is located at a lower portion of the casing, and has a perforation. The perforation is located at an end of the casing. The cable reel member is disposed within the casing. When the cable reel member is in a storing status, the cable reel member provides a pulling force. The connector is coupled with the cable reel member, and selectively stored within the sliding groove or protruded outside the sliding groove. When the connector is protruded outside the sliding groove, the connector is permitted to be plugged into a computer system. The connector has an operating part exposed outside the perforation. By moving the operating part, the connector is removable from the sliding groove. The sliding member is disposed within the sliding groove and located beside the connector. The sliding member is movable within the sliding groove. The elastic element is used for providing an elastic force to the sliding member. A first end of the elastic element is in contact with the sliding member. A second end of the elastic element is coupled with a terminal edge of the sliding groove. When the cable reel member is in the storing status, the connector is sustained against the sliding member in response to the pulling force, so that the sliding member is moved to a first position of the sliding groove and the connector is stored within the sliding groove. When the cable reel member is in a releasing status, the sliding member is moved to a second position of the sliding groove in response to the elastic force, so that the perforation is blocked by a front end of the sliding member.

In an embodiment, the cable reel member includes a connecting cable and a reel main body. The connecting cable is penetrated through the sliding member to be coupled with the connector. The reel main body is used for storing the connecting cable. When the cable reel member is in the releasing status, the connecting cable is protruded out of the reel main body and exposed outside the casing. When the cable reel member is in the storing status, the pulling force is generated by the reel main body, so that the connecting cable is stored within the reel main body in response to the pulling force.

In an embodiment, when the cable reel member is in the storing status, the connecting cable is stored within the reel main body in response to the pulling force generated by the reel main body, and the connector coupled with the connecting cable is sustained against the sliding member, so that the sliding member is moved to the first position of the sliding groove to compress the elastic element and the connector is stored within the sliding groove. When the cable reel member is in the releasing status, the pulling force is no longer generated by the reel main body, so that the sliding member is moved to the second position of the sliding groove in response to the elastic force generated by the compressed elastic element and the perforation is blocked by the front end of the sliding member.

In an embodiment, the retractable cable mouse further includes a pressing member. The pressing member is disposed over the sliding groove to stop the connecting cable from being escaped from the sliding member.

In an embodiment, the connector further includes a grip part and a connecting part. The grip part is coupled with the connecting cable to be gripped by a user. The connecting part is disposed on the grip part to be plugged into the computer system.

In an embodiment, the operating part is integrally formed with the grip part of the connector.

In an embodiment, the connector is a universal series bus (USB) connector, and the connecting part is a universal series bus interface.

In an embodiment, the retractable cable mouse further includes an auxiliary roller. The auxiliary roller is in contact with a connecting cable of the cable reel member for facilitating the connecting cable to be pulled out of the casing or stored within the casing. The casing further includes a post, which is arranged between the sliding groove and the cable reel member. In addition, the auxiliary roller is sheathed around the post, so that the auxiliary roller is fixed on the casing.

In an embodiment, the retractable cable mouse further includes an upper cover, a scroll wheel, a circuit board, an encoder, a displacement sensing element, and a plurality of triggering switches. The upper cover is used for sheltering the casing, wherein the upper cover has an upper cover opening. The scroll wheel is disposed on a scroll wheel seat of the casing and partially penetrated through the upper cover opening to be exposed outside the upper cover, wherein a scroll wheel shaft is penetrated through the scroll wheel. The circuit board disposed on the lower portion of the casing. The encoder is disposed on the circuit board and arranged at a side of the scroll wheel. An end of the scroll wheel shaft is inserted into the encoder. Moreover, the encoder generates a scrolling signal in response to rotation of the scroll wheel. The displacement sensing element is disposed on the circuit board for detecting movement of the casing, thereby generating a motion signal. The triggering switches are disposed on the circuit board. When one of the triggering switches is triggered, a corresponding signal is generated.

In an embodiment, the elastic element is a helical spring.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 4:
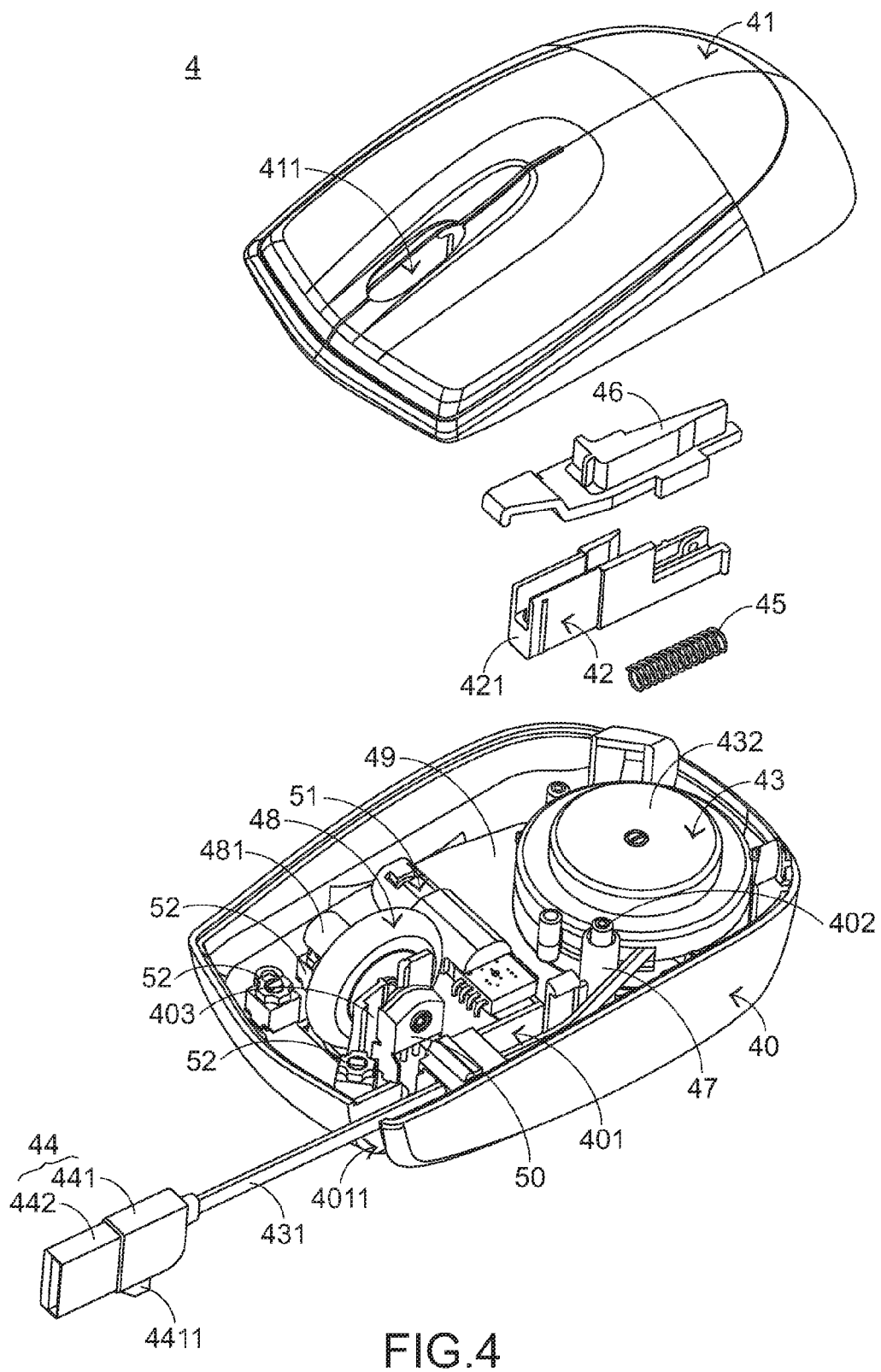
FIG. 4 is a schematic exploded view illustrating a retractable cable mouse according to an embodiment of the present invention.
Figure 5:
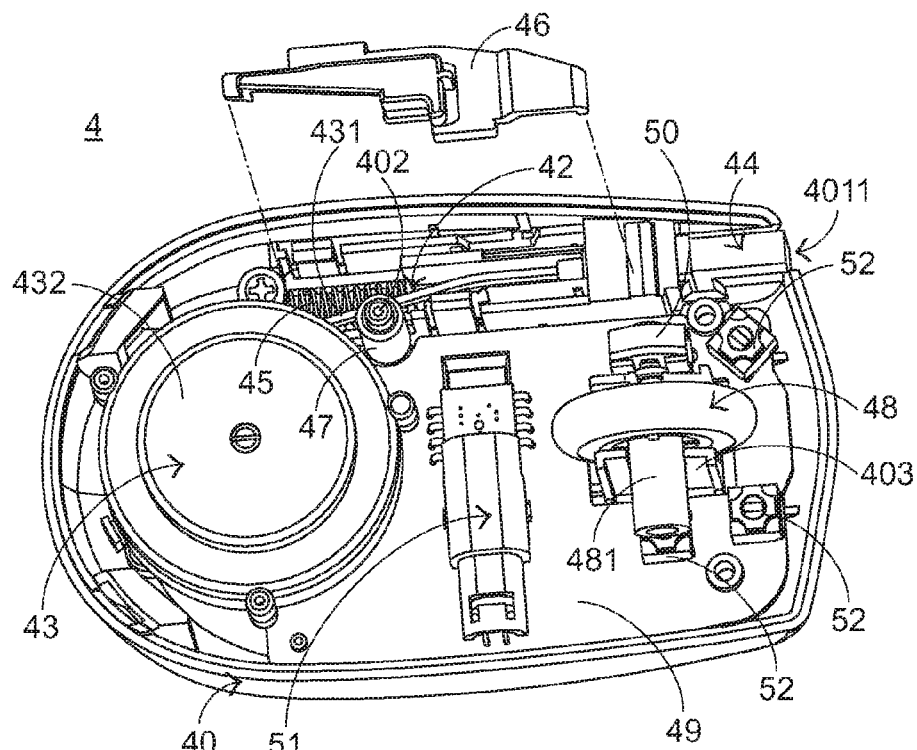
FIG. 5 is a schematic perspective view illustrating the internal portion of the retractable cable mouse according to the embodiment of the present invention.

FIG. 4 is a schematic exploded view illustrating a retractable cable mouse according to an embodiment of the present invention. FIG. 5 is a schematic perspective view illustrating the internal portion of the retractable cable mouse according to the embodiment of the present invention. As shown in FIGS. 4 and 5, the retractable cable mouse 4 comprises a casing 40, an upper cover 41, a sliding member 42, a cable reel member 43, a connector 44, an elastic element 45, a pressing member 46, an auxiliary roller 47, a scroll wheel 48, a circuit board 49, an encoder 50, a displacement sensing element 51, and a plurality of triggering switches 52.

The casing 40 comprises a sliding groove 401, a post 402, and a scroll wheel seat 403. The sliding groove 401 is located at a lower portion of the casing 40. The sliding groove 401 is used for accommodating the sliding member 42, the connector 44 and the elastic element 45. The sliding groove 401 has a perforation 4011 and a terminal edge 4012 (see FIG. 7). The perforation 4011 is located at an end of the casing 40. The scroll wheel seat 403 is disposed on the lower portion of the casing 40. The scroll wheel 48 is installed on the scroll wheel seat 403. In addition, the upper cover 41 has an upper cover opening 411.

Please refer to FIGS. 4 and 5 again. The scroll wheel 48 is disposed on the scroll wheel seat 403 of the casing 40. In addition, the scroll wheel 48 has a scroll wheel shaft 481. The scroll wheel shaft 481 is penetrated through the scroll wheel 48. The circuit board 49 is also disposed on the lower portion of the casing 40. The encoder 50 is disposed on the circuit board 49 and located at a side of the scroll wheel 48. A first end of the scroll wheel shaft 481 is inserted into the encoder 50. In response to the rotation of the scroll wheel 48, the encoder 50 generates a scrolling signal. The displacement sensing element 51 is disposed on the circuit board 49 for detecting movement of the casing 40. In response to movement of the casing 40, the displacement sensing element 51 generates a motion signal. The triggering switches 52 are disposed on the circuit board 49. When the triggering switches 52 are triggered, corresponding signals are generated. For example, in a case that the triggering switch 52 is triggered by a second end of the scroll wheel shaft 481, a wheel pressing signal is generated. Whereas, in a case that a corresponding triggering switch 52 is triggered by a first button part or a second part of the upper cover 41, a first button signal or a second button signal is generated.

Figure 1:
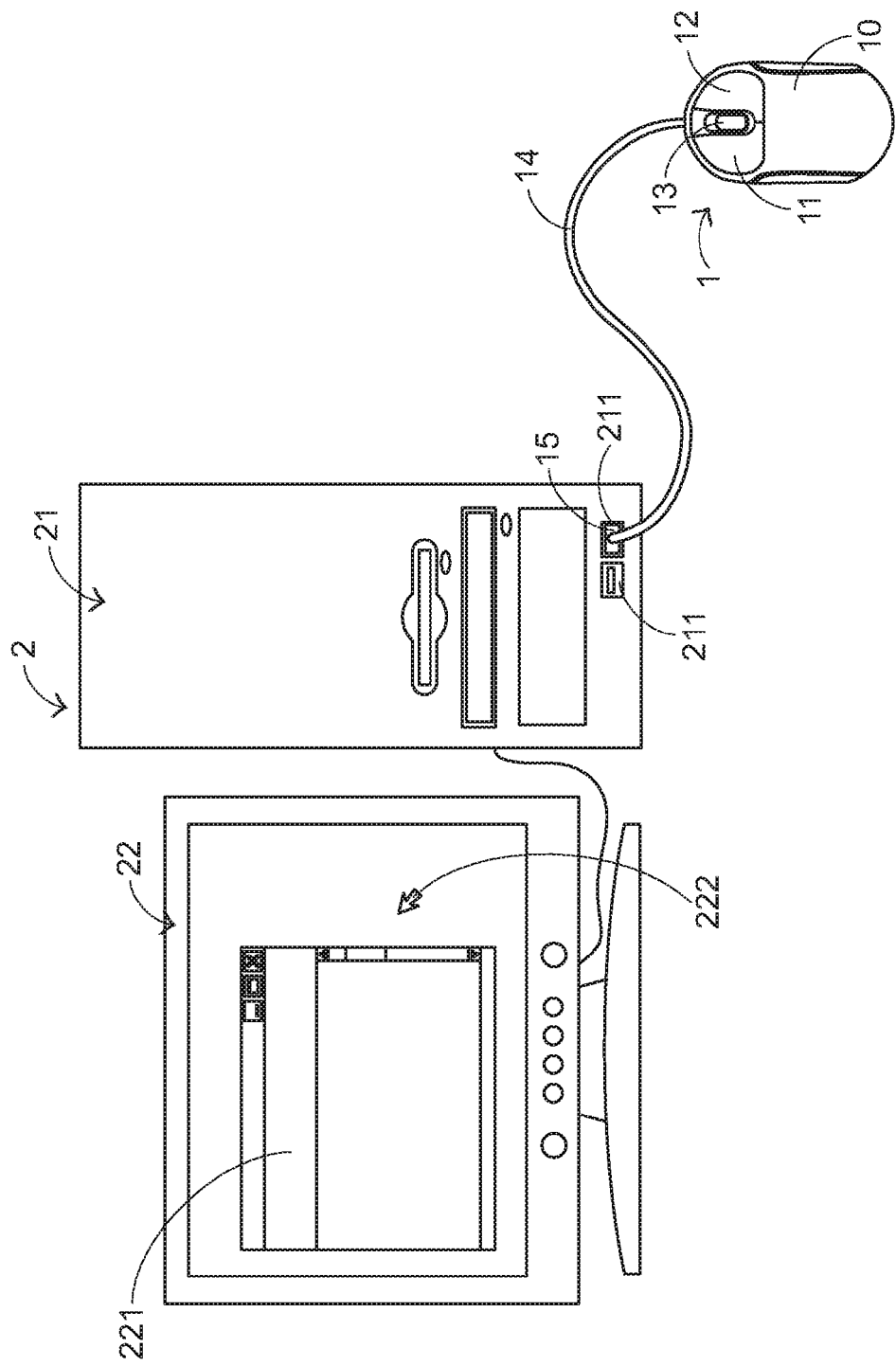
FIG. 1 schematically illustrates the connection between a conventional mouse and a computer system.
Figure 2:
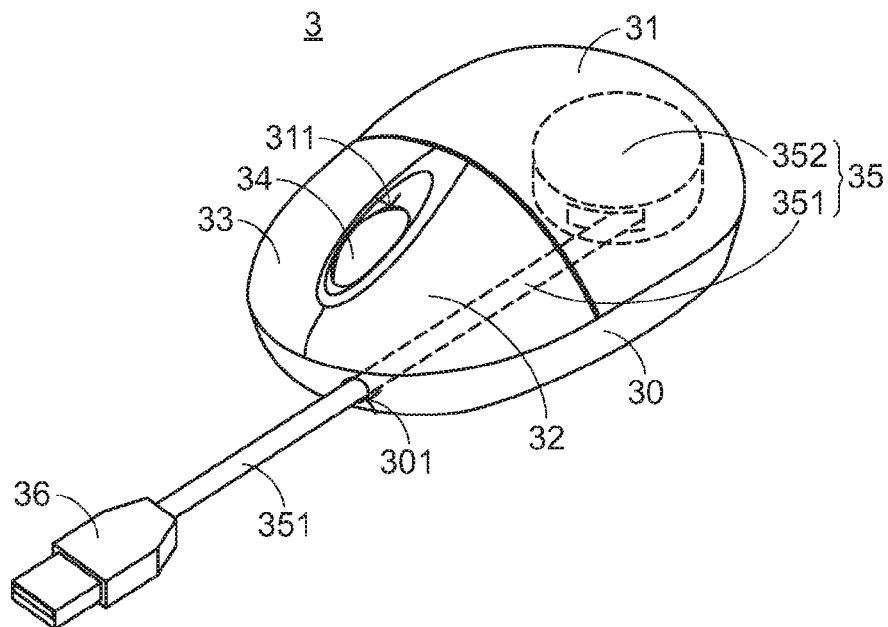
FIG. 2 is a schematic perspective view illustrating a conventional retractable cable mouse.
Figure 3:
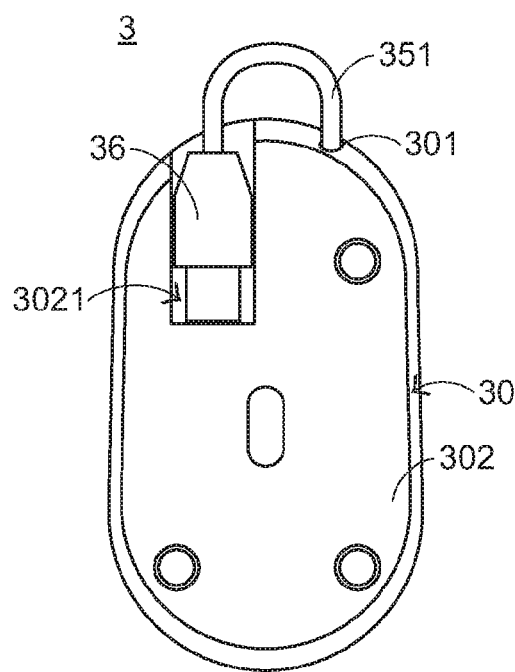
FIG. 3 schematically illustrates the conventional retractable cable mouse whose connector is stored.

The cable reel member 43 is disposed on the circuit board 49 within the casing 40. In addition, the cable reel member 43 is located at a side of the displacement sensing element 51. The cable reel member 43 comprises a connecting cable 431 and a reel main body 432. The connecting cable 431 is penetrated through the sliding member 42 and coupled with the connector 44. The reel main body 432 is used for storing the connecting cable 431. The connector 44 is coupled with the connecting cable 431 of the cable reel member 43. In addition, the connector 44 is selectively stored within the sliding groove 401 or protruded outside the sliding groove 401. When the connector 44 is protruded outside the sliding groove 401, the connector 44 may be plugged into a computer system 2 (see FIG. 2). The connector 44 comprises a grip part 441 and a connecting part 442. The grip part 441 is coupled with the connecting cable 431. In addition, the grip part 441 has an operating part 4411. The operating part 4411 is exposed outside the perforation 4011. The user may move the operating part 4411 in a direction distant from the casing 40 in order to remove the connector 44 from the sliding groove 401. The connecting part 442 is disposed on the grip part 441 to be plugged into the connecting port 211 of the computer host 21 (see FIG. 2). In a preferred embodiment, the operating part 4411 is integrally formed with the grip part 441. In this embodiment, the connector 44 is a universal series bus (USB) connector, and the connecting part 442 is a USB interface.

The post 402 is arranged between the sliding groove 401 and the cable reel member 43. The auxiliary roller 47 is sheathed around the post 402, so that the auxiliary roller 47 is fixed on the casing 40. Moreover, the auxiliary roller 47 is in contact with the connecting cable 431 of the cable reel member 43 for facilitating pulling out or storing the connecting cable 431. In such way, during the process of pulling out or storing the connecting cable 431, the connecting cable 431 is not contacted with the casing 40 or other components and thus the possibility of abrading the connecting cable 431 is minimized. The pressing member 46 is disposed over the sliding groove 401 to stop the connecting cable 431 from being escaped from the sliding member 42. The sliding member 42 is accommodated within the sliding groove 401 and located beside the connector 44. In this embodiment, the sliding member 42 is substantially has an elongated U-shaped structure (see FIG. 4). The functions of the elastic element 45 will be illustrated in more details later.

Figure 6:
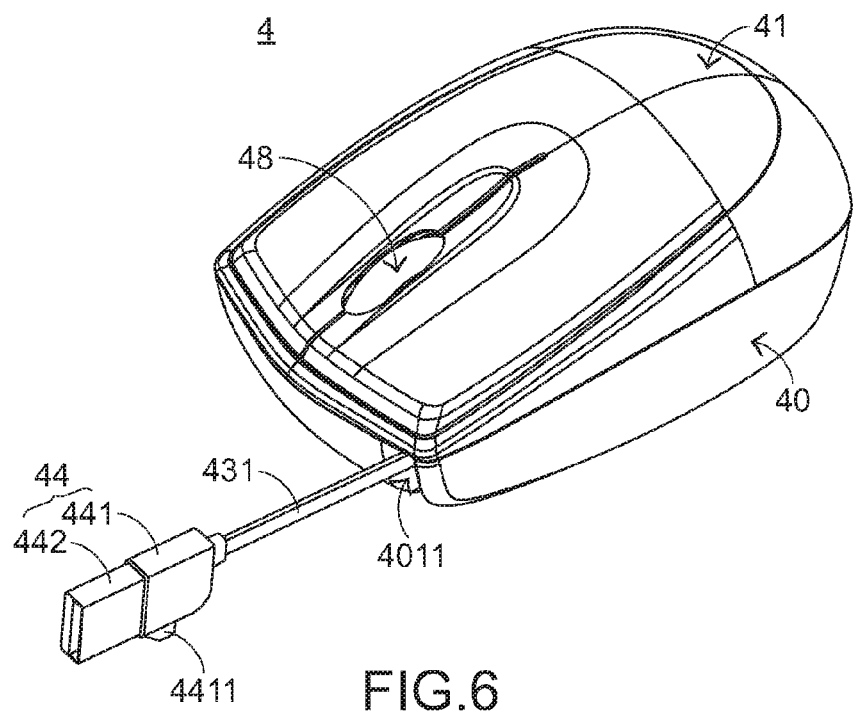
FIG. 6 is a schematic assembled view illustrating the outward appearance of the retractable cable mouse according to the embodiment of the present invention.

After the above components are assembled into the retractable cable mouse 4, the outward appearance thereof is shown in FIG. 6. FIG. 6 is a schematic assembled view illustrating the outward appearance of the retractable cable mouse according to the embodiment of the present invention. As shown in FIG. 6, the scroll wheel 48 of the retractable cable mouse 4 is partially penetrated through the upper cover opening 411 and exposed outside the upper cover 41, so that the scroll wheel 48 can be manipulated by the user.

Figure 7:
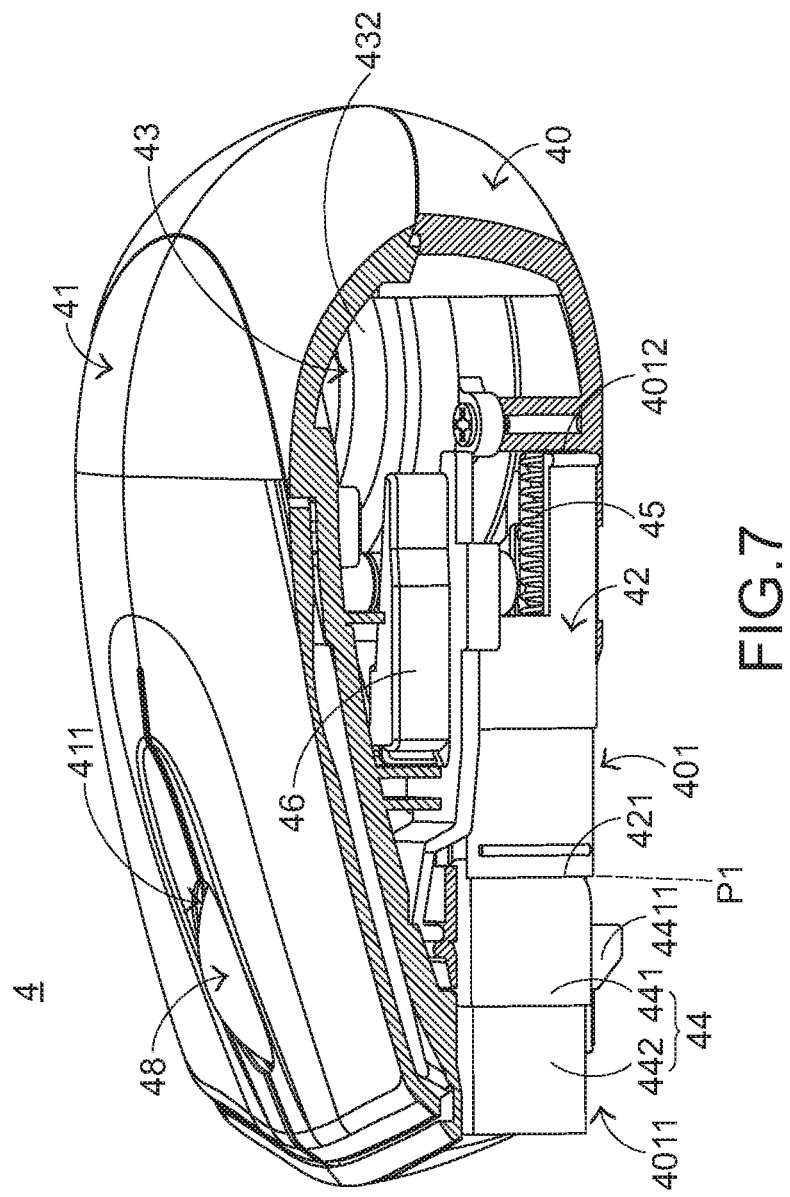
FIG. 7 is a schematic cutaway view of the retractable cable mouse according to the embodiment of the present invention, in which the connector is stored within the casing.

FIG. 7 is a schematic cutaway view of the retractable cable mouse according to the embodiment of the present invention, in which the connector is stored within the casing. Hereinafter, the configurations of the elastic element 45 will be illustrated in more details. The elastic element 45 is accommodated within the sliding groove 401 and located beside the sliding member 42. A first end of the elastic element 45 is in contact with the sliding member 42. A second end of the elastic element 45 is coupled with the terminal edge 4012 of the sliding groove 401. The elastic element 45 is used for providing an elastic force to the sliding member 42. In this embodiment, the elastic element 45 is a helical spring.

Hereinafter, a process of storing the connector 44 of the retractable cable mouse 4 will be illustrated with reference to FIG. 7. In a case that the retractable cable mouse 4 is in a non-usage status and the user wants to store the connector 44, the connecting cable 431 is externally pulled in a direction distant from the sliding groove 401, so that the cable reel member 43 is in a storing status. Meanwhile, in response to a pulling force generated by the reel main body 432, the connecting cable 431 is retracted in the direction toward the reel main body 432 and stored within the reel main body 432. Moreover, in response to the pulling force, the grip part 441 of the connector 44 is sustained against a front end 421 of the sliding member 42, and the sliding member 42 is moved within the sliding groove 401. In response to movement of the sliding member 42, the elastic element 45 coupled with the sliding member 42 is compressed, and the sliding member 42 is slid to a first position P1 of the sliding groove 401. Under this circumstance, the connector 44 is located at the position corresponding to the perforation 4011 of the sliding groove 401, and the operating part 4411 of the connector 44 is exposed outside the perforation 4011.

Figure 8:
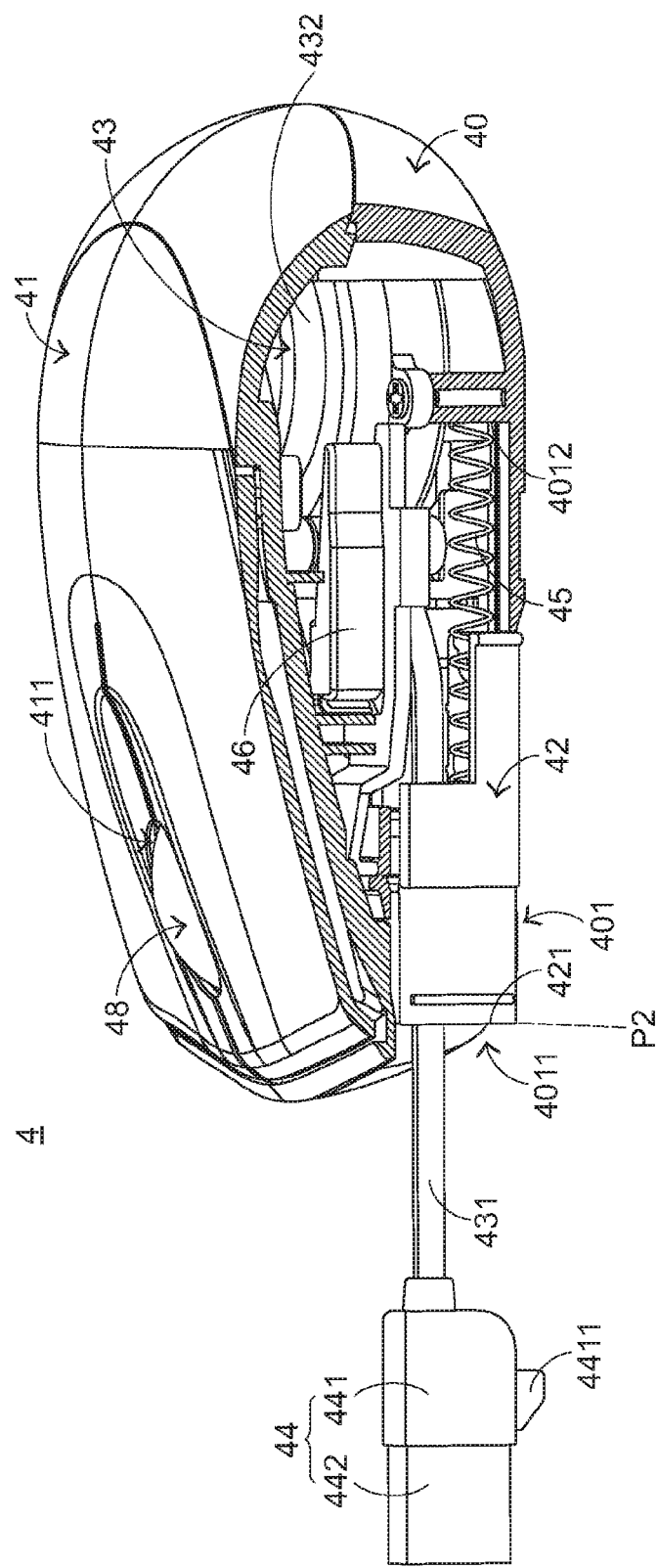
FIG. 8 is a schematic cutaway view of the retractable cable mouse according to the embodiment of the present invention, in which the connector is pulled out of the casing.

FIG. 8 is a schematic cutaway view of the retractable cable mouse according to the embodiment of the present invention, in which the connector is pulled out of the casing. For using the retractable cable mouse 4, the user may move the operating part 4411 of the connector 44, which is exposed outside the perforation 4011, in order to remove the connector 44 from the sliding groove 401. Then, the connector 44 is externally pulled in the direction distant from the sliding groove 401, so that the cable reel member 43 is switched from the storing status to a releasing status. In the releasing status, the pulling force is no longer generated by the reel main body 432. Meanwhile, in response to an elastic force generated by the compressed elastic element 45, the elastic element 45 is restored to the original length, and the sliding member 42 is moved from the first position P1 to a second position P2 of the sliding groove 401. Meanwhile, the perforation 4011 of the sliding groove 401 is blocked by the front end 421 of the sliding member 42. After the connector 44 of casing 40 is escaped from the perforation 4011, the connector 44 can be pulled out and thus plugged into the connecting port 211 of the computer host 21 (see FIG. 2). Under this circumstance, the communication between the retractable cable mouse 4 and the computer host 21 is established, so that the movement of the cursor can be controlled by operating the retractable cable mouse 4.

From the above description, in a case that the user does not want to operate the retractable cable mouse 4, the user may pull out the connecting cable 431 to retrieve the connecting cable 431 back to the reel main body 432. Meanwhile, the connector 44 is sustained against the sliding member 42, and thus the connector 44 and the sliding member 42 are accommodated within the sliding groove 401. Since the elastic element 45 is pushed by the sliding member 42, the elastic element 45 is compressed. Whereas, in a case that the user wants to operate the retractable cable mouse 4, the user may move the operating part 4411 of the connector 44 in order to remove the connector 44 from the sliding groove 401. Moreover, after the action of retrieving the connecting cable 431 back to the reel main body 432 is released, in response to the elastic force generated by the compress elastic element 45, the elastic element is restored to the original length and the sliding member 42 is moved to the second position P2. Under this circumstance, since the perforation 4011 of the sliding groove 401 is blocked by sliding member 42, the external dust or foreign material fails to be introduced into the internal portion of the casing 40 through the perforation 4011.

As previously described, since the connector of the conventional retractable cable mouse is stored within the receiving recess of the bottom surface of the casing, the connector is exposed outside the casing and easily damaged. On the other hand, since the connector of the retractable cable mouse of the present invention can be completely stored within the casing, the connector can be effectively protected. Moreover, for storing the connector of the conventional retractable cable mouse, since it is necessary to bend the connecting cable of the cable reel member, the connecting cable is easily damaged. On the other hand, since the connector of the retractable cable mouse of the present invention can be completely stored within the casing without the need of bending the connecting cable, the efficacy of protecting the connecting cable is enhanced. Moreover, the use of the auxiliary roll in the retractable cable mouse of the present invention can further protect the connecting cable. By means of the auxiliary roll, during the process of pulling out or storing the connecting cable, the connecting cable is not contacted with the casing or other components and thus the possibility of abrading the connecting cable is minimized. In other words, the retractable cable mouse of the present invention is easily carried and aesthetically pleasing, and has good efficacy of protecting the connecting cable and the connector.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A retractable cable mouse, comprising:
   a casing having a sliding groove, wherein said sliding groove is located at a lower portion of said casing, and has a perforation, wherein said perforation is located at an end of said casing;
   a cable reel member disposed within said casing, wherein when said cable reel member is in a storing status, said cable reel member provides a pulling force;
   a connector coupled with said cable reel member, and selectively stored within said sliding groove or protruded outside said sliding groove, wherein when said connector is protruded outside said sliding groove, said connector is permitted to be plugged into a computer system, wherein said connector has an operating part exposed outside said perforation, wherein by moving said operating part, said connector is removable from said sliding groove;
   a sliding member disposed within said sliding groove and located beside said connector, wherein said sliding member is movable within said sliding groove; and
   an elastic element for providing an elastic force to said sliding member, wherein a first end of said elastic element is in contact with said sliding member, and a second end of said elastic element is coupled with a terminal edge of said sliding groove, wherein when said cable reel member is in said storing status, said connector is sustained against said sliding member in response to said pulling force, so that said sliding member is moved to a first position of said sliding groove and said connector is stored within said sliding groove, wherein when said cable reel member is in a releasing status, said sliding member is moved to a second position of said sliding groove in response to said elastic force, so that said perforation is blocked by a front end of said sliding member.

2. The retractable cable mouse according to claim 1, wherein said cable reel member comprises:
   a connecting cable penetrated through said sliding member to be coupled with said connector; and
   a reel main body for storing said connecting cable, wherein when said cable reel member is in said releasing status, said connecting cable is protruded out of said reel main body and exposed outside said casing, wherein when said cable reel member is in said storing status, said pulling force is generated by said reel main body, so that said connecting cable is stored within said reel main body in response to said pulling force.

3. The retractable cable mouse according to claim 2, wherein when said cable reel member is in said storing status, said connecting cable is stored within said reel main body in response to said pulling force generated by said reel main body, and said connector coupled with said connecting cable is sustained against said sliding member, so that said sliding member is moved to said first position of said sliding groove to compress said elastic element and said connector is stored within said sliding groove, wherein when said cable reel member is in said releasing status, said pulling force is no longer generated by said reel main body, so that said sliding member is moved to said second position of said sliding groove in response to said elastic force generated by said compressed elastic element and said perforation is blocked by said front end of said sliding member.

4. The retractable cable mouse according to claim 2, further comprising a pressing member, which is disposed over said sliding groove to stop said connecting cable from being escaped from said sliding member.

5. The retractable cable mouse according to claim 2, wherein said connector further comprises:
   a grip part coupled with said connecting cable to be gripped by a user; and
   a connecting part disposed on said grip part to be plugged into said computer system.

6. The retractable cable mouse according to claim 5, wherein said operating part is integrally formed with said grip part of said connector.

7. The retractable cable mouse according to claim 5, wherein said connector is a universal series bus (USB) connector, and said connecting part is a universal series bus interface.

8. The retractable cable mouse according to claim 1, further comprising an auxiliary roller, which is in contact with a connecting cable of said cable reel member for facilitating said connecting cable to be pulled out of said casing or stored within said casing, wherein said casing further comprises a post, which is arranged between said sliding groove and said cable reel member, wherein said auxiliary roller is sheathed around said post, so that said auxiliary roller is fixed on said casing.

9. The retractable cable mouse according to claim 1, further comprising:
   an upper cover for sheltering said casing, wherein said upper cover has an upper cover opening;
   a scroll wheel disposed on a scroll wheel seat of said casing and partially penetrated through said upper cover opening to be exposed outside said upper cover, wherein a scroll wheel shaft is penetrated through said scroll wheel;
   a circuit board disposed on said lower portion of said casing;
   an encoder disposed on said circuit board and arranged at a side of said scroll wheel, wherein an end of said scroll wheel shaft is inserted into said encoder, and said encoder generates a scrolling signal in response to rotation of said scroll wheel;
   a displacement sensing element disposed on said circuit board for detecting movement of said casing, thereby generating a motion signal; and
   a plurality of triggering switches disposed on said circuit board, wherein when one of said triggering switches is triggered, a corresponding signal is generated.

10. The retractable cable mouse according to claim 1, wherein said elastic element is a helical spring.

* * * * *